United States Patent
Lin (10) Patent No.: US 7,606,009 B2
(45) Date of Patent: Oct. 20, 2009

(54) READ SENSOR STABILIZED BY BIDIRECTIONAL ANISOTROPY

(75) Inventor: Tsann Lin, Saratoga, CA (US)

(73) Assignee: Hitachi Global Storage Technologies Netherlands B.V., Amsterdam (NL)

( * ) Notice: Subject to any disclaimer, the term of this patent is extended or adjusted under 35 U.S.C. 154(b) by 392 days.

(21) Appl. No.: 11/376,537

(22) Filed: Mar. 15, 2006

(65) Prior Publication Data

US 2007/0217082 A1 Sep. 20, 2007

(51) Int. Cl.
*G11B 5/33* (2006.01)
(52) U.S. Cl. .................................. 360/324.11
(58) Field of Classification Search ............... None
See application file for complete search history.

(56) References Cited

U.S. PATENT DOCUMENTS

| | | | |
|---|---|---|---|
| 6,847,509 B2 | 1/2005 | Yoshikawa et al. | |
| 6,881,496 B2 | 4/2005 | Okamoto | |
| 6,888,706 B2 | 5/2005 | Ooshima | |
| 6,893,734 B2 | 5/2005 | Hasegawa et al. | |
| 6,893,740 B2 | 5/2005 | Saito | |
| 6,901,652 B2 | 6/2005 | Hasegawa et al. | |
| 6,927,950 B2 | 8/2005 | Ito et al. | |
| 6,947,263 B2 | 9/2005 | Saito | |
| 7,242,556 B2 * | 7/2007 | Gill | 360/324.12 |
| 7,397,637 B2 * | 7/2008 | Gill | 360/324.12 |
| 7,423,849 B2 * | 9/2008 | Gill | 360/324.11 |
| 2002/0075609 A1 | 6/2002 | Terunuma | |
| 2002/0191451 A1 | 12/2002 | Kishi et al. | |
| 2003/0072111 A1 | 4/2003 | Hasegawa et al. | |
| 2003/0193760 A1 | 10/2003 | Sakaguci et al. | |
| 2003/0197987 A1 | 10/2003 | Saito | |
| 2003/0218836 A1 | 11/2003 | Shimazawa et al. | |
| 2003/0231436 A1 | 12/2003 | Nishiyama | |
| 2004/0058197 A1 | 3/2004 | Nakamura et al. | |
| 2004/0072020 A1 | 4/2004 | Hasegawa et al. | |
| 2004/0100737 A1 | 5/2004 | Nakamoto et al. | |
| 2004/0207960 A1 | 10/2004 | Saito et al. | |
| 2005/0028352 A1 | 2/2005 | Shimazawa et al. | |
| 2005/0207072 A1 | 9/2005 | Matsuzaka et al. | |
| 2005/0280957 A1 * | 12/2005 | Gill | 360/324.12 |
| 2006/0044708 A1 * | 3/2006 | Gill | 360/324.12 |
| 2007/0047153 A1 * | 3/2007 | Zeltser | 360/324 |
| 2007/0064350 A1 * | 3/2007 | Gill | 360/324.2 |

* cited by examiner

*Primary Examiner*—Mark Blouin
(74) *Attorney, Agent, or Firm*—Duft Bornsen & Fishman, LLP (57) ABSTRACT

A read sensor stabilized by bidirectional anisotropy is disclosed. The read sensor includes a longitudinal flux-closure structure comprising an antiferromagnetic pinning layer, a ferromagnetic bias layer, a nonmagnetic spacer layer, and a ferromagnetic sense layer. In this longitudinal flux-closure structure, the antiferromagnetic pinning layer directly couples to the ferromagnetic bias layer inducing strong unidirectional anisotropy, and also indirectly couples to the ferromagnetic sense layer inducing weak unidirectional anisotropy. In addition, the ferromagnetic bias layer antiparallel-couples to the ferromagnetic sense layer across the nonmagnetic spacer layer inducing optimal bidirectional anisotropy. The magnetization of the ferromagnetic bias layer thus remains rigidly pinned mainly due to the strong unidirectional anisotropy, while the magnetization of the ferromagnetic sense layer can rotate freely and stably due to the optimal bidirectional anisotropy.

32 Claims, 9 Drawing Sheets

READ SENSOR STABILIZED BY BIDIRECTIONAL ANISOTROPY

BACKGROUND OF THE INVENTION

1. Field of the Invention

The invention is related to the field of magnetic disk drive systems, and in particular, to a read sensor of a magnetic disk drive system that is stabilized by a bidirectional anisotropy.

2. Statement of the Problem

A typical storage system contains one or more magnetic disk drives for longitudinal or perpendicular magnetic recording. The magnetic disk drive typically includes a magnetic disk and a transducer made of write and read heads. The transducer is supported by a slider, which is mounted on a suspension arm. When the magnetic disk is stationary, the suspension arm biases the slider into contact with the surface of the magnetic disk. When the magnetic disk rotates, an air flow generated by the rotation of the magnetic disk causes an air bearing surface (ABS) of the slider to ride a particular height above the magnetic disk. The height depends on the shape of the ABS. As the slider rides on the air bearing, an actuator moves an actuator arm that is connected to the suspension arm to position the transducer over selected tracks of the magnetic disk.

A typical read head includes first and second ferromagnetic shields, first and second insulating gaps, a giant magnetoresistance (GMR) read sensor used in a current-in-plane (CIP) mode in a central region, bias stacks and conducting leads in side regions. The GMR sensor is sandwiched between the first and second gaps, which are in turn sandwiched between the first and second shields. In addition, the GMR sensor is connected with the bias stacks, which are in turn connected with the conducting leads. A sense current may flow in a forward longitudinal direction (through the first conducting leads, the first bias stack, the GMR sensor, the second bias stack, and the second conducting leads), or in a backward longitudinal direction. When reading data from the rotating magnetic disk, the read head is positioned over transitions on a track of the rotating magnetic disk in order for the read sensor to detect magnetic fields created by the transitions. In response to these magnetic fields, the resistance of the GMR sensor changes. The sense current manifests these resistance changes as voltage changes, which are processed to read the data encoded on the track of the rotating magnetic disk.

In order to perform longitudinal magnetic recording at densities beyond 100 Gb/in$^2$, the read head has been progressively miniaturized by fabricating the read sensor as thin as 40 nm, as narrow as 60 nm, and as short as 80 nm, and sandwiching the read sensor between the top and bottom gaps as thin as 20 nm. In contrast, in order for the smaller read sensor to perform a stable read process, the thickness of the bias stack has been progressively increased. However, this progressive thickness increase of the bias stack inevitably causes a progressive decrease in read sensitivity. Hence, in order to perform longitudinal recording at ever higher densities, a further miniaturized read head may not be viable due to low read sensitivity. To attain high read sensitivity, a read head including a read sensor used in a current-perpendicular-to-plane (CPP) mode may be used as described below.

Figure 1:
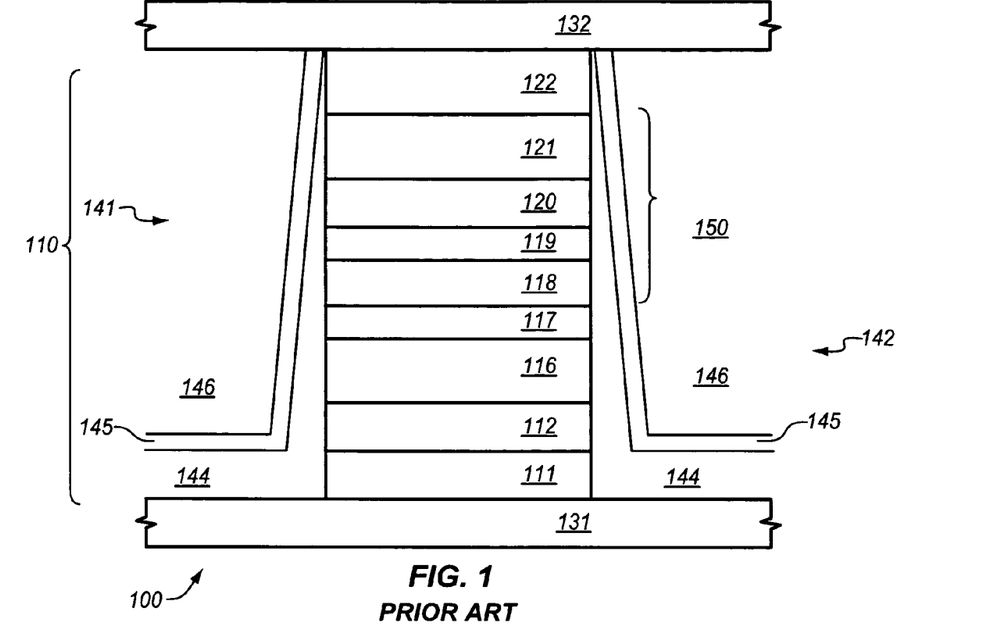
FIG. 1 illustrates a read head including a read sensor stabilized by hard magnetics.

FIG. 1 illustrates a read head 100 including a read sensor 110 stabilized by hard magnetics. FIG. 1 is a view from the ABS of the read head 100. The read head 100 includes first and second ferromagnetic shields 131-132, either a GMR or tunnel magnetoresistance (TMR) read sensor 110 used in a CPP mode in a central region, and bias stacks 141-142 in side regions. The read sensor 110 is connected with the first and second shields 131-132, and isolated by the bias stacks 141-142. A sense current may flow in an outward direction from the slider (through the first shield 131, the read sensor 110, and the second shield 132), or in an inward direction to the slider.

The read sensor 110 comprises a nonmagnetic Ta seed layer 111, a nonmagnetic Ru seed layer 112, a ferromagnetic Co—Fe sense layer 116, a nonmagnetic spacer or barrier layer 117, a ferromagnetic Co—Fe pinned reference layer 118, a nonmagnetic Ru spacer layer 119, a ferromagnetic Co—Fe pinned keeper layer 120, an antiferromagnetic Ir—Mn—Cr pinning layer 121, and a nonmagnetic Ta cap layer 122. The spacer/barrier layer 117 may comprise a spacer layer or a barrier layer depending on whether the read sensor 110 is a GMR or a TMR read sensor. If the read sensor 110 comprises a GMR read sensor, then the spacer layer 117 may comprise an oxide film, such as Cu—O, Al—O, Co—Fe—O, etc, sandwiched between two Cu films. If the read sensor 110 comprises a TMR read sensor, then the barrier layer 117 may comprise an oxide film, such as Al—O, Mg—O, Ti—O, etc.

The read head 100 is annealed in an upward transverse direction perpendicular to and away from the ABS in order to magnetically set magnetizations of the Co—Fe keeper layer 120 and the Co—Fe reference layer 118. In the read sensor 110, the Ir—Mn—Cr pinning layer 121 directly couples to the Co—Fe keeper layer 120 inducing a unidirectional anisotropy in the upward transverse direction. The Co—Fe keeper layer 120 also antiparallel-couples to the Co—Fe reference layer 118 across the Ru spacer layer 119 inducing a bidirectional (or unaxial) anisotropy. As a result, the magnetization of the Co—Fe keeper layer 120 is still aligned in the upward transverse direction, while the magnetization of the Co—Fe reference layer 118 is aligned in a downward transverse direction perpendicular to and towards the ABS. The coexistence of the unidirectional and bidirectional anisotropies thus cause the formation of a transverse flux-closure structure 150. The transverse flux-closure structure 150 facilitates the read sensor 110 to operate properly.

Each of the bias stacks 141-142 may comprise a nonmagnetic Al$_2$O$_3$ separation layer 144, a nonmagnetic Cr seed layer 145, and a hard-magnetic Co—Pt—Cr bias layer 146. The Al$_2$O$_3$ separation layer 144 confines the sense current to flow through the read sensor 110. The Cr seed layer 145 substantially improves hard-magnetic properties of the Co—Pt—Cr bias layer 146. The Co—Pt—Cr bias layer 146 provides a magnetic moment to eliminate stray fields at edges of the read sensor 110, and provides bias fields to counteract demagnetizing fields in the Co—Fe sense layer 116. When the moment at edges of the read sensor 110 is comparable to that of the sense layer 116 and the bias fields are optimal to suppress domain activities in the Co—Fe sense layer 116 through magnetostatic interactions, the read sensor 110 can operate with high read sensitivity and good stability.

There are several disadvantages in using the read sensor 110 stabilized by hard magnetics. First, both the Al$_2$O$_3$ separation layer 144 and the Cr seed layer 145 must be thick enough to avoid current shunting and ensure good hard-magnetic properties, respectively. However, these thickness requirements lead to wide separation between the Co—Fe sense layer 116 and the Co—Pt—Cr bias layer 146, and cause difficulties in aligning the mid-planes of the Co—Fe sense layer 116 and the Co—Pt—Cr bias layer 146, thus inevitably reducing stabilization efficiency. Second, the Co—Pt—Cr bias layer 146 must be thick enough to provide a moment comparable to that of the Co—Fe sense layer 116 at edges of the read sensor 110. However, it is difficult to control its thickness at edges of the read sensor 110 due to shadowing effects of the photoresist, thus causing concerns on stray-field-induced side reading due to a deficient moment or low read sensitivity due to an excessive moment. Third, the bias fields are high in end regions of the Co—Fe sense layer 116 but low in the central region of the Co—Fe sense-layer 116. These non-uniform bias fields reveal complicated hard magnetics. Fourth, as the read sensor 110 is further miniaturized for magnetic recording at ever higher densities, demagnetizing fields will significantly increase, leading to difficulties in stabilizing the Co—Fe sense layer 116 by hard magnetics.

Figure 2:
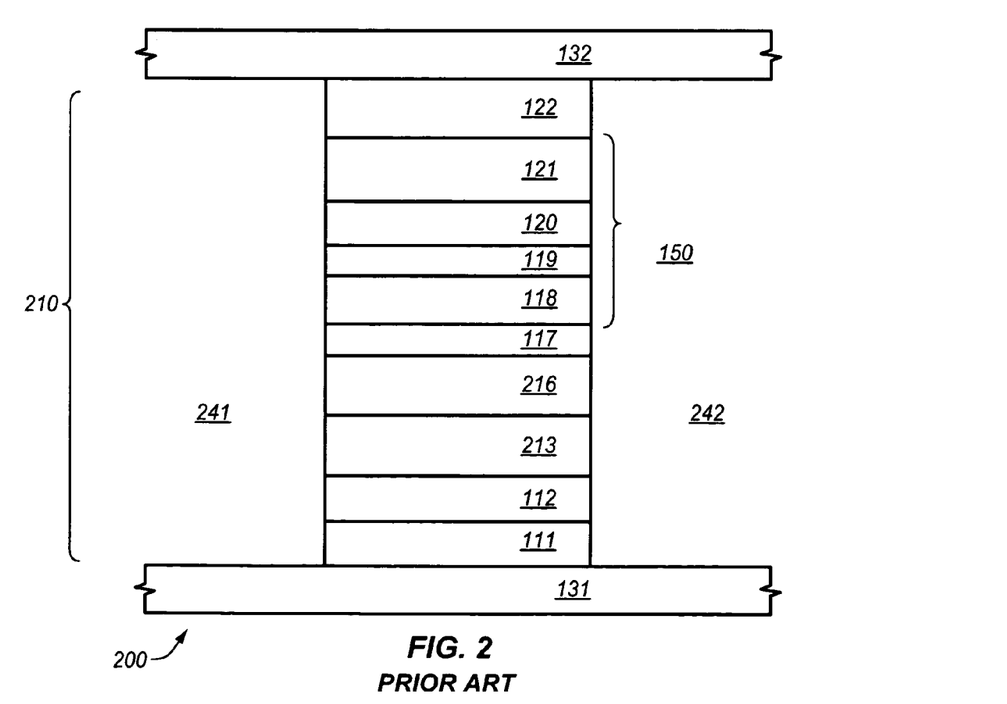
FIG. 2 illustrates an alternative read head including a read sensor stabilized by a direct unidirectional anisotropy.

FIG. 2 illustrates an alternative read head 200 including a read sensor 210 stabilized by a direct unidirectional anisotropy. FIG. 2 is again a view from the ABS of the read head 200. The read head 200 is substantially equivalent to the read head 100, except that the Co—Fe sense layer 116 is replaced by a ferromagnetic Co—Fe sense layer 216, and an antiferromagnetic Ir—Mn—Cr pinning layer 213 is sandwiched between the Ru seed layer 112 and the Co—Fe sense layer 216. Also, the bias stacks 141-142 are replaced by $Al_2O_3$ separators 241-242. The Co—Fe sense layer 216 is slightly thicker than the Co—Fe sense layer 116 of FIG. 1 in order to compensate an additional moment loss caused by contact with the Ir—Mn—Cr pinning layer 213, thereby attaining the same designed sense-layer moment.

The read head 200 is annealed in the upward transverse direction to form the transverse flux-closure structure 150. The read head 200 is then annealed again in the forward longitudinal direction in order to magnetically set the magnetization of the Co—Fe sense layer 216. In the read sensor 210, the antiferromagnetic Ir—Mn—Cr pinning layer 213 directly couples to the Co—Fe sense layer 216 in the forward longitudinal direction inducing a direct unidirectional anisotropy. This direct unidirectional anisotropy can be high in order for a further miniaturized read sensor to counteract substantially increasing demagnetizing fields and to operate stably, but still cannot be too high to ensure high read sensitivity. An optimal direct unidirectional anisotropy can be attained by utilizing the Ta seed layer 111, the Ru seed layer 112, and the Ir—Mn—Cr pinning layer 213 with optimal thicknesses and compositions.

Figure 3:
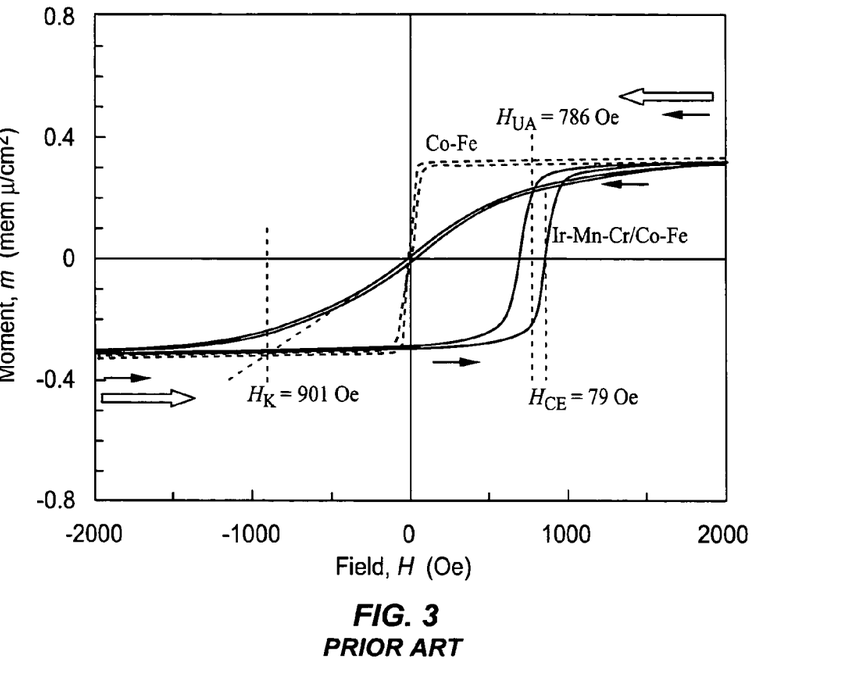
FIG. 3 illustrates easy-axis and hard-axis magnetic responses of lower portions of read sensors in read heads of FIGS. 1 and 2.

FIG. 3 illustrates easy-axis and hard-axis magnetic responses of Ta(3)/Ru(2)/Co—Fe(2.08)/Cu(2.4)/Ta(3) and Ta(3)/Ru(2)/Ir—Mn—Cr(6)/Co—Fe(2.24)/Cu(2.4)/Ta(3) films (thickness in nm). The first multilayer structure forms the lower portion of the read sensor 110 of FIG. 1. Without the Ir—Mn—Cr pinning layer 213, the Co—Fe sense layer 116 exhibits soft ferromagnetic properties such as an easy-axis coercivity ($H_{CE}$) of 4.4 Oe and a uniaxial anisotropy field ($H_K$) of 5.8 Oe (corresponding to a permeability of as high as 1,724). The second multilayer structure forms the lower portion of the read sensor 210 of FIG. 2. With the Ir—Mn—Cr pinning layer 213, the Co—Fe sense layer 216 exhibits an easy-axis hysteresis loop shifted by a unidirectional anisotropy strength ($H_{UA}$) of 786 Oe. This high $H_{UA}$ uniformly biases the entire the Co—Fe sense layer 216, counteracting very high demagnetizing fields and thus stabilizing the Co—Fe sense layer 216. The Co—Fe sense layer 216 also exhibits an $H_{CE}$ of as high as 79 Oe and an $H_K$ of as high as 901 Oe (corresponding to a permeability of as low as 11.1). Because the hard-axis hysteresis loop is nearly closed, a transfer curve attained during the operation of the read sensor 210 can thus be nearly closed. However, the low permeability, which indicates low read sensitivity, still remains a concern.

Figure 4:
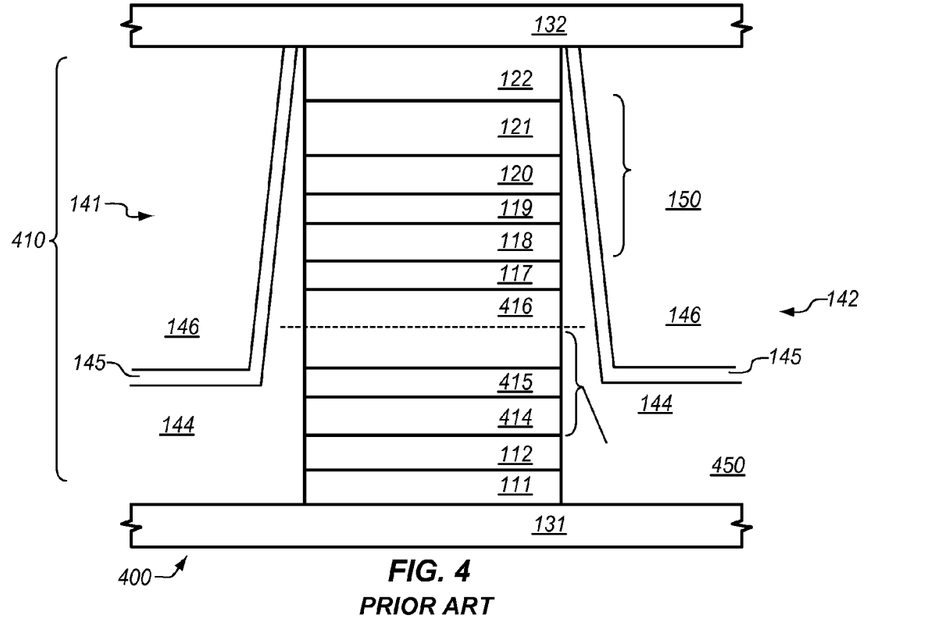
FIG. 4 illustrates another alternative read head including a read sensor stabilized by hard magnetics.

FIG. 4 illustrates another alternative read head 400 including a read sensor 410 stabilized by hard magnetics. FIG. 4 is again a view from the ABS of the read head 400. The read head 400 is substantially equivalent to the read head 100, except that the sense layer 116 is replaced by an antiparallel-coupled structure comprising a ferromagnetic Co—Fe bias layer 414, a nonmagnetic Ru spacer layer 415, and a ferromagnetic Co—Fe sense layer 416 in the read sensor 410. The Co—Fe sense layer 416 is about two times thicker than the Co—Fe sense layer 116 of FIG. 1, and functions as if two sublayers, one the lower sublayer having the same moment as that of the Co—Fe bias layer 414, and the other upper sublayer having a designed sense-layer moment.

The read head 400 is annealed in the upward transverse direction to form the transverse flux-closure structure 150. The read head 400 is then placed in a high field in the backward longitudinal direction in order to magnetically set the magnetizations of the Co—Fe bias layer 414 and the Co—Fe sense layer 416. The Co—Fe bias layer 414 antiparallel-couples to the lower sublayer of the Co—Fe sense layer 416 across the Ru spacer layer 415, inducing another bidirectional anisotropy and forming a longitudinal flux-closure structure 450. Due to the moment cancellation in the longitudinal flux-closure structure 450, only the upper sublayer of the Co—Fe sense layer 416 having a net moment equivalent to the designed value remains free.

Figure 5:
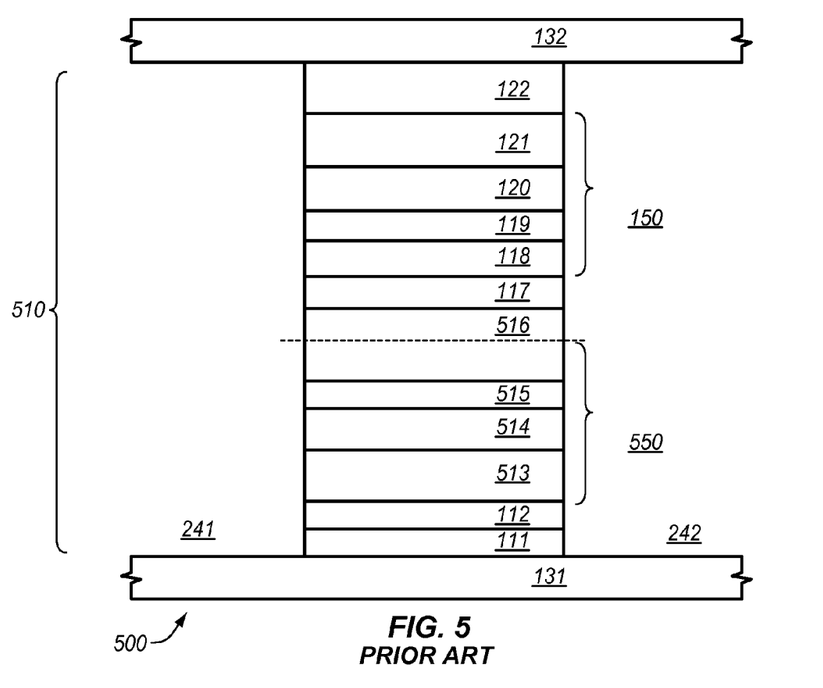
FIG. 5 illustrates another alternative read head including a read sensor stabilized by an indirect unidirectional anisotropy.

FIG. 5 illustrates another alternative read head 500 including a read sensor 510 stabilized by an indirect unidirectional anisotropy. FIG. 5 is again a view from the ABS of the read head 500. The read head 500 is substantially equivalent to the read head 100 of FIG. 1, except that the sense layer 116 is replaced by an antiparallel-pinned structure comprising an antiferromagnetic Ir—Mn—Cr pinning layer 513, a ferromagnetic Co—Fe bias layer 514, a nonmagnetic Ru spacer layer 515, and a ferromagnetic Co—Fe sense layer 516. The Co—Fe sense layer 516 is about two times thicker than the Co—Fe sense layer 116 of FIG. 1, and functions as if two sublayers, one the lower sublayer having the same moment as that of the Co—Fe bias layer 514, and the other upper sublayer having a designed sense-layer moment.

The read head 500 is annealed in the upward transverse direction to form the transverse flux-closure structure 150. The read head 500 is then annealed again in the backward longitudinal direction in order to magnetically set the magnetizations of the Co—Fe bias layer 514 and the Co—Fe sense layer 516. In the read sensor 510, the antiferromagnetic Ir—Mn—Cr pinning layer 513 directly couples to the Co—Fe bias layer 514 in the backward longitudinal direction inducing a direct unidirectional anisotropy, and also indirectly couples to the Co—Fe sense layer 516 in the backward longitudinal direction inducing an indirect unidirectional anisotropy. In addition, the Co—Fe bias layer 514 strongly antiparallel-couples to the lower sublayer of the Co—Fe sense layer 516 across the Ru spacer layer 515, inducing another bidirectional anisotropy and forming a longitudinal flux-closure structure 550. Due to the moment cancellation in the longitudinal flux-closure structure 550, only the upper sublayer of the Co—Fe sense layer 516 having a net moment equivalent to the designed value remains weakly pinned (or biased) by the indirect unidirectional anisotropy.

Figure 6:
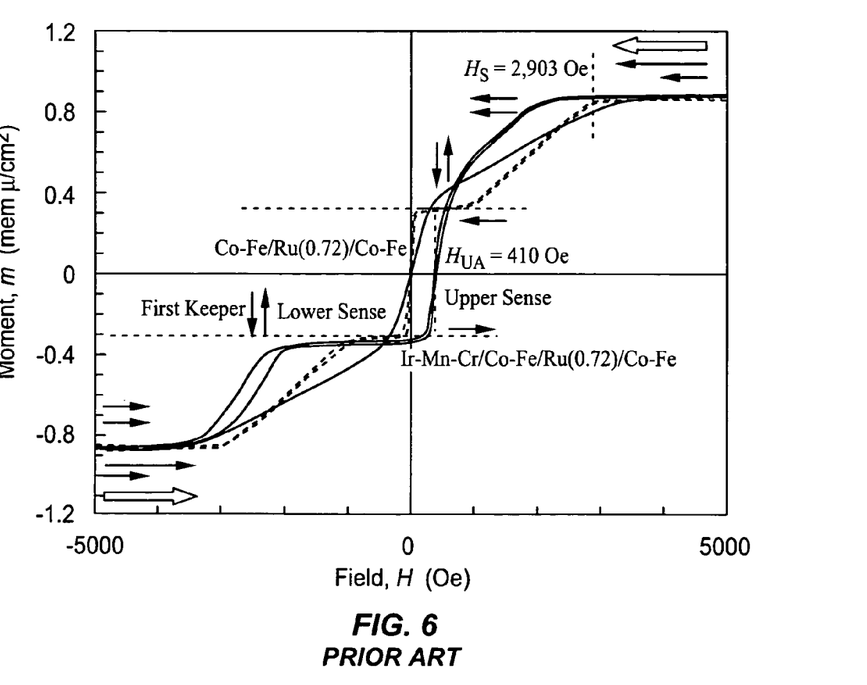
FIG. 6 illustrates easy-axis and hard-axis magnetic responses of lower portions of read sensors in read heads of FIGS. 4 and 5.

FIG. 6 illustrates easy-axis and hard-axis magnetic responses of Ta(3)/Ru(2)/Co—Fe(2.34)/Ru(0.7)/Co—Fe(4.16)/Cu(2.4)/Ta(3) and Ta(3)/Ru(2)/Ir—Mn—Cr(6)/Co—Fe(2.44)/Ru(0.7)/Co—Fe(4.16)/Cu(2.4)/Ta(3) films. The first multilayer structure forms the lower portion of the read sensor 410. As a field increases in a backward longitudinal direction to a critical field $H_2$ of 1,014 Oe, magnetizations of the Co—Fe bias layer 414 and the lower sublayer of the Co—Fe sense layer 416 immediately flip by 90° into downward and upward transverse directions, respectively, and slightly rotate towards the backward longitudinal direction to attain 2% of their saturation moment. As the field further increases to critical fields $H_{50}$ and $H_{98}$ of 1,816 and 2,903 Oe, respectively, both the magnetizations gradually rotate towards the backward longitudinal direction to attain 50 and 98% of their saturation moment, respectively. These $H_2$, $H_{50}$ and $H_{98}$ values define a flip strength ($H_{FL}$), a bidirectional anisotropy strength ($H_{BA}$), and a saturation strength ($H_S$), respectively. As the field increases in a forward longitudinal direction, both magnetizations also flip and rotate identically, indicating that the bidirectional anisotropy in the longitudinal flux-closure structure 450 without the Ir—Mn—Cr pinning layer 513 is symmetrical. In addition, easy-axis and hard-axis magnetic responses are indistinguishable from each other, indicating that the bidirectional anisotropy is also isotropic. In contrast, the magnetization of the upper portion of the Co—Fe sense layer 416 still remains free, exhibiting soft ferromagnetic properties such as an $H_{CE}$ of 10.4 Oe and an $H_K$ of 11.1 Oe.

The second multilayer structure forms the lower portion of the read sensor 510. As the field increases in the backward longitudinal direction, $H_2$, $H_{50}$ and $H_{98}$ are determined to be low as 534, 1,154, and 2,136 Oe, respectively. However, as the field increases in the forward longitudinal direction, $H'_2$, $H'_{50}$ and $H'_{98}$ are determined to be as high as 1,688, 2,490, and 3,409 Oe, respectively. In addition, the hysteresis loops are open, revealing a hysteretic magnetization switching behavior. Such asymmetrical flip, rotation, and switching behaviors indicate the incorporation of the unidirectional anisotropy into the bidirectional anisotropy in the longitudinal flux-closure structure 550 with the Ir—Mn—Cr pinning layer 513. In addition, the upper sublayer of the Co—Fe sense layer 516 exhibits an $H_{UA}$ of as low as 410 Oe, and still soft ferromagnetic properties such as an $H_{CE}$ of 14 Oe and an $H_K$ of 233 Oe. In spite of these good magnetic properties, the read sensor 510 stabilized by the indirect unidirectional anisotropy is not viable because the second anneal will interrupt the transverse flux-closure structure 150 due to the close similarity between the transverse flux-closure structure 150 and the longitudinal flux-closure structure 550.

SUMMARY OF THE INVENTION

The invention solves the above and other related problems with an improved longitudinal flux-closure structure for a read sensor that is stabilized by a bidirectional anisotropy.

In one embodiment, the read sensor includes an antiferromagnetic pinning layer, a ferromagnetic bias layer, a nonmagnetic spacer layer, and a ferromagnetic sense layer. The antiferromagnetic pinning layer, the ferromagnetic bias layer, the nonmagnetic spacer layer, and the ferromagnetic sense layer create the improved longitudinal flux-closure structure for biasing the ferromagnetic sense layer. The longitudinal flux-closure structure is formed such that antiferromagnetic/ferromagnetic exchange coupling between the antiferromagnetic pinning layer and the ferromagnetic bias layer is stronger than ferromagnetic/ferromagnetic antiparallel coupling between the ferromagnetic bias layer and the ferromagnetic sense layer across the nonmagnetic spacer layer.

The exchange coupling between the antiferromagnetic pinning layer and the ferromagnetic bias layer is strong enough to rigidly pin the ferromagnetic bias layer. The exchange coupling is stronger than the antiparallel coupling between the ferromagnetic bias layer and the ferromagnetic sense layer across the nonmagnetic spacer layer so that the magnetization of the ferromagnetic bias layer remains rigidly pinned while the magnetization of the ferromagnetic sense layer rotates in response to external magnetic fields. The two ferromagnetic layers act as two independent units instead of acting as if one strongly antiparallel-coupled unit as described in the prior art. The ferromagnetic bias layer remains rigidly pinned to effectively bias the ferromagnetic sense layer.

The strong exchange coupling between the antiferromagnetic pinning layer and the ferromagnetic bias layer is attained by using suitable seed layers, such as a Ta film and a Ru film. The weak antiparallel coupling between the ferromagnetic bias layer and the ferromagnetic sense layer is attained by using a suitably thick nonmagnetic spacer layer. For instance, a spacer layer made of a Ru film that is at least 1.5 nm thick may provide the desired antiparallel coupling.

Other exemplary embodiments comprise methods of fabricating a read sensor described herein.

The invention may include other exemplary embodiments described below.

DESCRIPTION OF THE DRAWINGS

The same reference number represents the same element on all drawings.

DETAILED DESCRIPTION OF THE INVENTION

FIGS. 7-16 and the following description depict specific exemplary embodiments of the invention to teach those skilled in the art how to make and use the invention. For the purpose of teaching inventive principles, some conventional aspects of the invention have been simplified or omitted. Those skilled in the art will appreciate variations from these embodiments that fall within the scope of the invention. Those skilled in the art will appreciate that the features described below can be combined in various ways to form multiple variations of the invention. As a result, the invention is not limited to the specific embodiments described below, but only by the claims and their equivalents.

Figure 7:
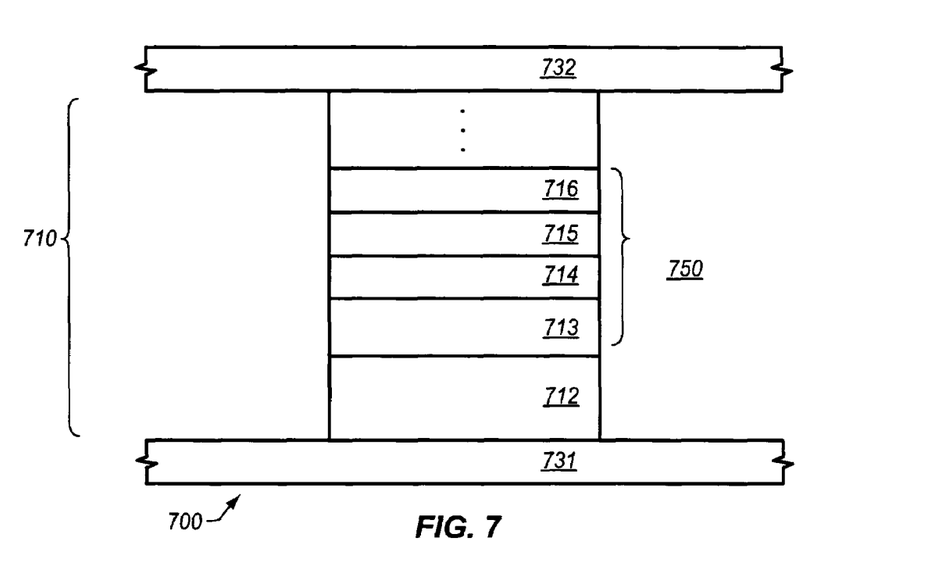
FIG. 7 illustrates a read head including a read sensor stabilized by a bidirectional anisotropy in an exemplary embodiment of the invention.

FIG. 7 illustrates a read head 700 including a read sensor 710 stabilized by a bidirectional anisotropy in an exemplary embodiment of the invention. FIG. 7 is a view from the ABS of the read head 700. Those skilled in the art understand that the read head 700 may include other layers in other exemplary embodiments for uses in a magnetic disk drive system or in other magnetic storage systems. The read head 700 includes a read sensor 710 sandwiched between a ferromagnetic shield 731 and a ferromagnetic shield 732. The read sensor 710, which may be either a GMR sensor or a TMR sensor, includes an improved longitudinal flux-closure structure 750. The longitudinal flux-closure structure 750 comprises an antiferromagnetic pinning layer 713, a ferromagnetic bias layer 714, a nonmagnetic spacer layer 715, and a ferromagnetic sense layer 716.

According to features and aspects herein, the longitudinal flux-closure structure 750 is improved over the previously described structures in that the exchange coupling between the antiferromagnetic pinning layer 713 and the ferromagnetic bias layer 714 is stronger than the antiparallel coupling across the nonmagnetic spacer layer 715 between the ferromagnetic bias layer 714 and the ferromagnetic sense layer 716. The exchange coupling between the antiferromagnetic pinning layer 713 and the ferromagnetic bias layer 714 is strong enough to rigidly pin the ferromagnetic bias layer 714. The exchange coupling is stronger than the antiparallel coupling between the ferromagnetic bias layer 714 and the ferromagnetic sense layer 716 across nonmagnetic spacer layer 715 so that the magnetization of ferromagnetic pinned bias layer 714 remains rigidly pinned while the magnetization of the ferromagnetic sense layer 716 rotates in response to external magnetic fields. The two ferromagnetic layers 714, 716 thus act as two independent units. The ferromagnetic bias layer 714 remains rigidly pinned to effectively bias the ferromagnetic sense layer 716.

The magnitude of the exchange coupling between the antiferromagnetic pinning layer 713 and the ferromagnetic bias layer 714 depends on the seed layer(s) 712 used in the read sensor 710. Suitable seed layers in this embodiment may be a Ta film and a Ru film, a Ta film and a Ni—Fe film, or other suitable seed layers.

The magnitude of the antiparallel coupling across the nonmagnetic spacer layer 715 depends on the thickness of the nonmagnetic spacer layer 715. One example of a nonmagnetic spacer layer 715 is a Ru film. The Ru film has a suitable thickness of at least 1.5 nm in this embodiment to provide the desired weak antiparallel coupling. The characteristics of the longitudinal flux-closure structure 750 may alternatively be described in terms of the anisotropy in the longitudinal flux-closure structure 750. In the longitudinal flux-closure structure 750, antiferromagnetic/ferromagnetic exchange coupling between the antiferromagnetic pinning layer 713 and the ferromagnetic bias layer 714 induces a unidirectional anisotropy. Ferromagnetic/ferromagnetic antiparallel coupling between the ferromagnetic bias layer 714 and the ferromagnetic sense layer 716 across the nonmagnetic spacer layer 715 induces a bidirectional anisotropy. According to aspects and features herein, the unidirectional anisotropy is larger than the bidirectional anisotropy to provide the desired biasing of the ferromagnetic sense layer 716. The magnetization of the ferromagnetic bias layer 714 is rigidly pinned due to the additive effects of the unidirectional anisotropy and the bidirectional anisotropy, while the magnetization of the ferromagnetic sense layer 716 is biased due to the subtractive effects of the unidirectional anisotropy and the bidirectional anisotropy.

The longitudinal flux-closure structure 750 is improved over the previously described structures. First, the antiferromagnetic pinning layer 713 and the nonmagnetic seed layer(s) 712 have specific compositions and thicknesses to strengthen the direct unidirectional anisotropy in order to rigidly pin the magnetization of the ferromagnetic bias layer 714. Second, the nonmagnetic spacer layer 715 is specifically thick to weaken the indirect unidirectional and bidirectional anisotropies in order to optimally bias the magnetization of the ferromagnetic sense layer 716 without a loss in read sensitivity. Third, the ferromagnetic sense layer 716 and the ferromagnetic bias layer 714 have moments equivalent to a designed value. The ferromagnetic sense layer 716 is free to rotate as a field exceeds a low bidirectional strength, while the ferromagnetic bias layer 714 remains rigidly pinned because the field still cannot overcome a high direct unidirectional anisotropy. The ferromagnetic sense layer 716 and the ferromagnetic bias layer 714 thus act as two independent units. Without concerns of moment cancellation caused by one strongly antiparallel-coupled unit as used in the previously described structures, it becomes simpler to select a thickness for the ferromagnetic sense layer 716 to exhibit a moment equivalent to the designed value.

Figure 8:
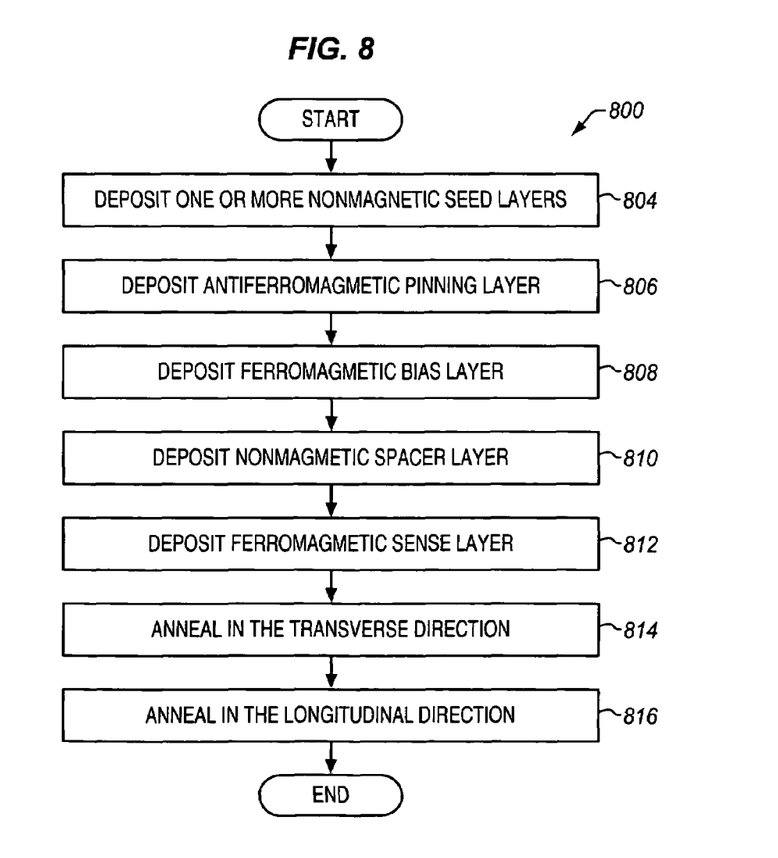
FIG. 8 is a flow chart illustrating a method of forming an improved longitudinal flux-closure structure in the read head of FIG. 7 in the exemplary embodiment of the invention.

FIG. 8 is a flow chart illustrating a method 800 of forming the longitudinal flux-closure structure 750 in the read head 700 of FIG. 7 in the exemplary embodiment of the invention. The steps of the method 800 will be described with reference to the read head 700, and are not all inclusive and may include other steps not shown. The longitudinal flux-closure structure 750 of FIG. 7 is formed by sequentially depositing multiple layers in an ion-beam sputtering system or another sputtering system.

In step 804, at least one nonmagnetic seed layer 712 is deposited on the ferromagnetic shield 731. The nonmagnetic seed layer(s) 712 may comprise a Ta film having a thickness ranging from 2 to 20 nm, and a Ru, Pt, Cr, or Cu film having a thickness ranging from 2 to 10 nm. Alternatively, the nonmagnetic seed layer(s) 712 may comprise a Ni—Cr—Fe film having a Cr content ranging from 20 to 60% (in atomic percent), an Fe content ranging from 0 to 20%, and a thickness ranging from 2 to 10 nm. In another alternative, an additional seed layer may comprise a Co—Fe or Ni—Fe film having an Fe content ranging from 0 to 40% and a thickness below 1 nm. This additional seed layer may be nonmagnetic due to moment losses caused by contact with the antiferromagnetic pinning layer 713.

In step 806, the antiferromagnetic pinning layer 713 is deposited on the nonmagnetic seed layer(s) 712. The antiferromagnetic pinning layer 713 may comprise an Ir—Mn—Cr film having a Mn content ranging from 50 to 90%, a Cr content ranging from 0 to 10%, and a thickness ranging from 4 to 10 nm. In step 808, the ferromagnetic bias layer 714 is deposited on the antiferromagnetic pinning layer 713. The ferromagnetic bias layer 714 may comprise a Co—Fe—B film having a Fe content ranging from 0 to 60%, a B content ranging from 0 to 40%, and a thickness ranging from 4 to 10 nm. In step 810, the nonmagnetic spacer layer 715 is deposited on the ferromagnetic bias layer 714. The nonmagnetic spacer layer 715 may comprise a Ru film having a thickness ranging from 1.5 to 2.1 nm, a Cr film having a thickness ranging from 1 to 2 nm, or an Ir film having a thickness ranging from 1 to 2 nm. In step 812, the ferromagnetic sense layer 716 is deposited on the nonmagnetic spacer layer 715. The ferromagnetic sense layer 716 may comprise a Co—Fe—Ni—B film having a Fe content ranging from 0 to 60%, a Ni content ranging from 0 to 40%, a B content ranging from 0 to 40%, and a thickness ranging from 4 to 10 nm.

After continuing deposition of other layers to fabricate the read head 700, the read head 700 is annealed in a transverse direction in step 814. The read head 700 is also annealed in a longitudinal direction in step 816. The anneal in the longitudinal direction is performed to develop strong unidirectional anisotropy in the longitudinal flux-closure structure 750. The anneal may be conducted for a time ranging from 1 to 6 hours in a field ranging from 100 to 1,000 Oe at a temperature ranging from 200 to 240° C.

Figure 9:
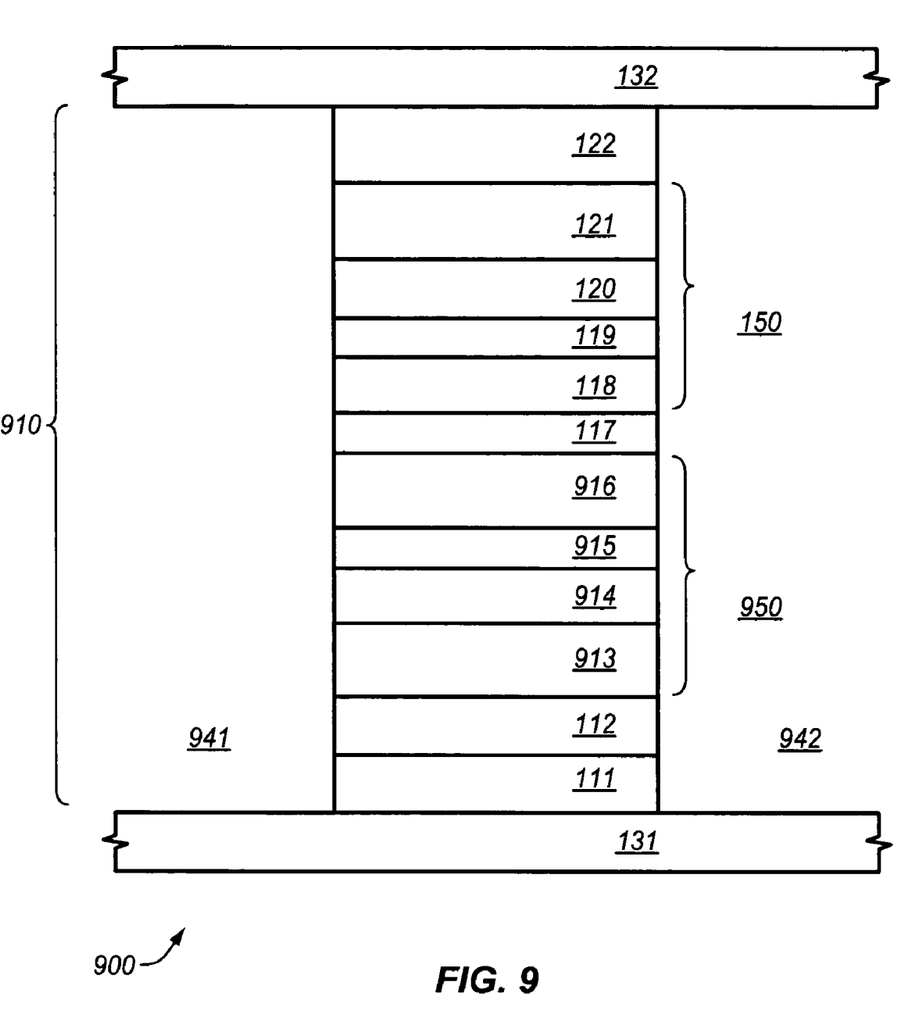
FIG. 9 illustrates a more detailed read head including a read sensor stabilized by a bidirectional anisotropy in an exemplary embodiment of the invention.

FIG. 9 illustrates a more detailed version of a read head 900 with a read sensor 910 stabilized by the bidirectional anisotropy in an exemplary embodiment of the invention. FIG. 9 is a view from the ABS of the read head 900. The read head 900 is substantially equivalent to the read head 100, except that a longitudinal flux-closure structure 950 replaces the ferromagnetic Co—Fe sense layer 116, and separators 941-942 replace the bias stacks 141-142, respectively, in the read sensor 910. The longitudinal flux-closure structure 950 comprises an antiferromagnetic Ir—Mn—Cr pinning layer 913, a ferromagnetic Co—Fe bias layer 914, a nonmagnetic Ru spacer layer 915, and a ferromagnetic Co—Fe sense layer 916. The separators 941-942 are made of a nonmagnetic Al₂O₃ film.

The read sensor 910 in the read head 900 may comprise a 3 nm thick nonmagnetic Ta seed layer 111, a 2 nm thick nonmagnetic Ru seed layer 112, a 6 nm thick antiferromagnetic Ir—Mn—Cr pinning layer 913, a 2.44 nm thick ferromagnetic Co—Fe bias layer 914, a 1.92 nm thick nonmagnetic Ru spacer layer 915, a 2.08 nm thick ferromagnetic Co—Fe sense layer 916, a nonmagnetic Cu(1.2)/oxide(0.8)/Cu(1.2) spacer layer 117 wherein the oxide may be Cu—O, Al—O, Co—Fe—O, etc, a 2.08 nm thick ferromagnetic Co—Fe reference layer 118, a 0.7 nm thick nonmagnetic Ru spacer layer 119, a 2.44 nm thick ferromagnetic Co—Fe keeper layer 120, a 6 nm thick antiferromagnetic Ir—Mn—Cr pinning layer 121, and a 6 nm thick nonmagnetic Ta cap layer 122. The Ir—Mn—Cr pinning layer 913, the Co—Fe bias layer 914, the Ru spacer layer 915, and the Co—Fe sense layer 916 form a longitudinal flux-closure structure 950. The Co—Fe reference layer 118, the Ru spacer layer 119, the Co—Fe keeper layer 120, and the Ir—Mn—Cr pinning layer 121 form a transverse flux-closure structure 150.

Figure 10:
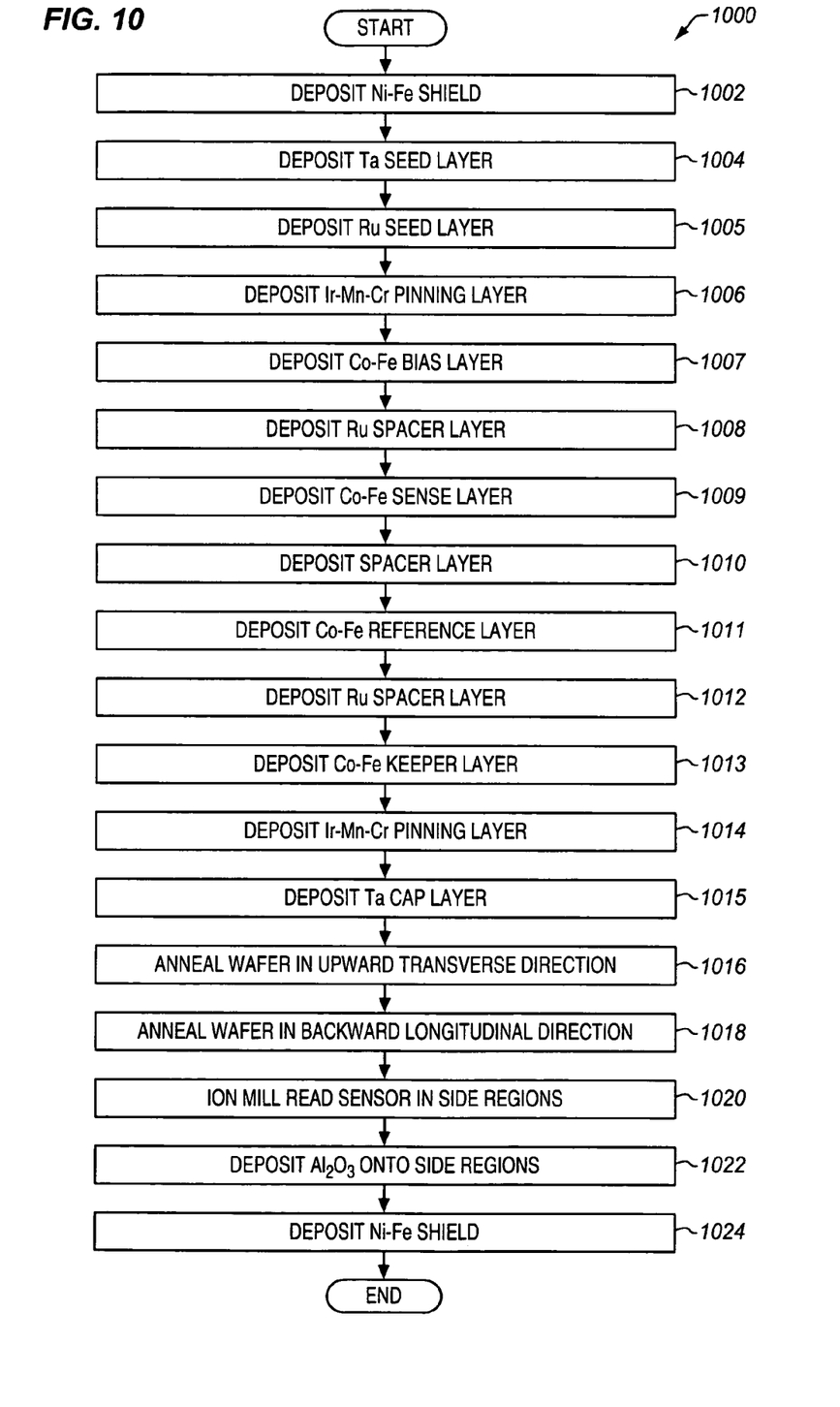
FIG. 10 is a flow chart illustrating a method of fabricating the read head of FIG. 9 in an exemplary embodiment of the invention.

FIG. 10 is a flow chart illustrating a method 1000 of fabricating the read head 900 in an exemplary embodiment of the invention. The steps of the method 1000 will be described with reference to the read head 900, and are not all inclusive and may include other steps not shown. In step 1002, a 1,000 nm thick ferromagnetic Ni—Fe shield 131 is deposited and patterned on a wafer (not shown in FIG. 9). Steps 1004-1015 provide for depositing the read sensor 910 in a magnetic field ranging from 100 to 1,000 Oe parallel to a predetermined forward longitudinal direction in an ion-beam sputtering system. In step 1004, the nonmagnetic Ta seed layer 111 is deposited on the Ni—Fe shield 131. In step 1005, the nonmagnetic Ru seed layer 112 is deposited on the Ta seed layer 111. In step 1006, the antiferromagnetic Ir—Mn—Cr pinning layer 913 is deposited on the Ru seed layer 112. In step 1007, the ferromagnetic Co—Fe bias layer 914 is deposited on the Ir—Mn—Cr pinning layer 913. In step 1008, the nonmagnetic Ru spacer layer 915 is deposited on the Co—Fe bias layer 914. In step 1009, the ferromagnetic Co—Fe sense layer 916 is deposited on the Ru spacer layer 915. In step 1010, the nonmagnetic Cu/oxide/Cu spacer layer 117 is deposited on the Co—Fe sense layer 916. In step 1011, the ferromagnetic Co—Fe reference layer 118 is deposited on the Cu/oxide/Cu spacer layer 117. In step 1012, the nonmagnetic Ru spacer layer 119 is deposited on the Co—Fe reference layer 118. In step 1013, the ferromagnetic Co—Fe keeper layer 120 is deposited on the Ru spacer layer 119. In step 1014, the antiferromagnetic Ir—Mn—Cr pinning layer 121 is deposited on the Co—Fe keeper layer 120. In step 1015, the nonmagnetic Ta cap layer 122 is deposited on the Ir—Mn—Cr pinning layer 121.

In step 1016, the wafer is annealed in a field ranging from 10,000 to 50,000 Oe in a predetermined upward transverse direction for a time ranging from 1 to 10 hours at temperatures ranging from 240 to 280° C. The anneal in step 1016 is conducted for magnetically setting magnetizations in the transverse flux-closure structure 150. The Ir—Mn—Cr pinning layer 121 rigidly pins the magnetization of the Co—Fe keeper layer 120 in the upward transverse direction, and in turn the magnetization of the Co—Fe keeper layer 120 strongly pins the magnetization of the Co—Fe reference layer 118 across the thin Ru spacer layer 119 in a downward transverse direction. Because the Co—Fe keeper layer 120 and the Co—Fe reference layer 118 have identical moments (0.28 memu/cm²), the strong antiparallel coupling results in a zero net moment and no demagnetizing fields at the transverse flux-closure structure 150.

In step 1018, the wafer is annealed again in a field ranging from 200 to 1,000 Oe in a backward longitudinal direction for a time ranging from 1 to 10 hours at temperatures ranging from 200 to 240° C. The anneal in step 1018 is conducted for magnetically setting magnetizations in the longitudinal flux-closure structure 950 without interrupting magnetizations in the transverse flux-closure structure 150. The Ir—Mn—Cr pinning layer 913 rigidly pins the magnetization of the Co—Fe bias layer 914 in the backward longitudinal direction, and in turn the magnetization of the Co—Fe bias layer 914 weakly pins (bias) the magnetization of the Co—Fe sense layer 916 across the thick Ru spacer layer 915 in the forward longitudinal direction. Because the Co—Fe bias layer 914 and the Co—Fe sense layer 916 have identical moments (0.28 memu/cm²), the weak antiparallel coupling results in a zero net moment and no demagnetizing fields at the longitudinal flux-closure structure 950.

After the two anneals in steps 1016 and 1018, a photoresist is applied and exposed in a photolithographic tool to mask the read sensor 910 in a read region. In step 1020, the read sensor 910 in unmasked side regions is ion milled until the Ni—Fe shield 131 is exposed. In step 1022, a 40 nm thick $Al_2O_3$ film is deposited on the side regions of the read sensor 910. The photoresist is then removed by chemical/mechanical polishing (CMP). In step 1024, the Ni—Fe shield 132 is deposited. After completing the fabrication of the read head 900, the fabrication of a write head may begin. After completing fabrication of read and write heads, the wafer is sliced and lapped to produce many transducers made of the write and read heads.

Figure 11:
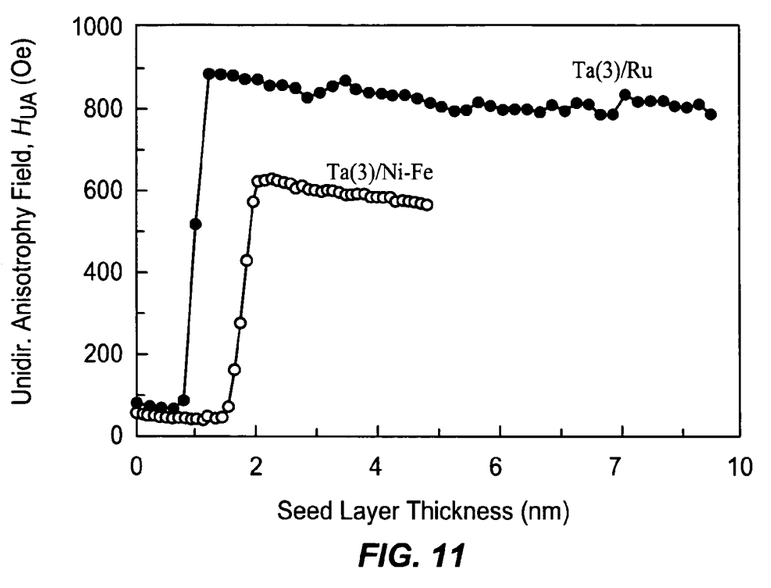
FIG. 11 is a graph of $H_{UA}$ (normalized for a moment of 0.28 memu/cm$^2$) versus the seed layer thickness for Ta(3)/Ni—Fe/Ir—Mn—Cr(6)/Co—Fe(4)/Ru2)/Ta(3) and Ta(3)/Ru/Ir—Mn—Cr(6)/Co—Fe(4)/Ru(2)/Ta(3) films.

Instead of the Ta and Ni—Fe seed layers commonly used in the prior art, the Ta seed layer 111 and Ru seed layer 112 are selected to facilitate the Ir—Mn—Cr pinning layer 913 and the Co—Fe bias layer 914 to exhibit a high unidirectional anisotropy strength ($H_{UA}$). FIG. 11 is a graph of $H_{UA}$ (normalized for a moment of 0.28 memu/$cm^2$) versus the seed layer thickness for Ta(3)/Ni—Fe/Ir—Mn—Cr(6)/Co—Fe(4)/Ru(2)/Ta(3) and Ta(3)/Ru/Ir—Mn—Cr(6)/Co—Fe(4)/Ru(2)/Ta(3) films. With the Ta first seed layer only, $H_{UA}$ is below 100 Oe. With the Ta first seed layer and with the Ru or Ni—Fe second seed layer, $H_{UA}$ substantially increases. The Ru second seed layer with a thickness greater than 1.5 nm appears to be the best in providing an $H_{UA}$ greater than 800 Oe.

It should be noted that the multiple layers described in this embodiment are deposited with an ion-beam sputtering mode. If the multiple layers are deposited with a magnetron sputtering mode, less mixing at an Ir—Mn—Cr/Co—Fe interface will cause substantial improvements in the unidirectional anisotropy. For example, a change in the deposition mode from ion-beam to magnetron sputtering for the Ta(3)/Ru(2)/Ir—Mn—Cr(6)/Co—Fe(4)/Ru(2)/Ta(3) films causes an increase in the normalized $H_{UA}$ from 871 to 1,833 Oe, corresponding with an increase in an interface exchange energy from 0.24 to 0.48 erg/$cm^2$. However, such an extremely strong unidirectional anisotropy is not needed for the longitudinal flux-closure structure 950 because it may indirectly stiffen the magnetization of the Co—Fe sense layer 916. The ion-beam sputtering mode is thus used in this embodiment.

In the longitudinal flux-closure structure 950 comprising the Ir—Mn—Cr/Co—Fe/Ru/Co—Fe films, the Ir—Mn—Cr pinning layer 913 is used to provide a strong unidirectional anisotropy, and the Ru spacer layer 915 is thick enough to provide a weak bidirectional anisotropy. If the Ru spacer layer 915 has the same thickness (0.7 nm) as the Ru spacer layer 119, then the longitudinal flux-closure structure 950 will be indistinguishable from the transverse flux-closure structure 150, and the read sensor 910 will not be viable as described below.

Figure 12:
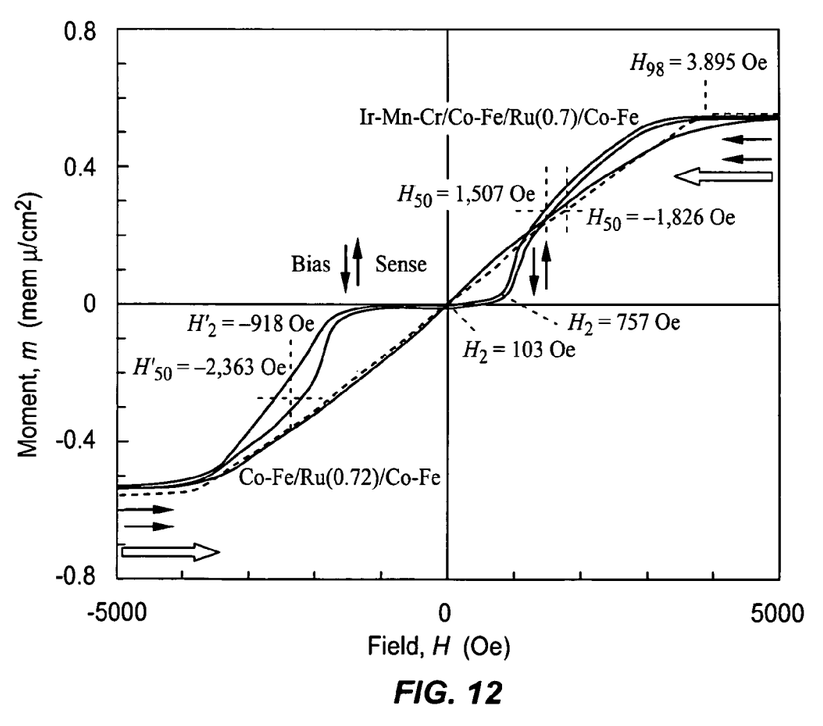
FIG. 12 is a graph illustrating easy-axis and hard-axis magnetic responses of Ta(3)/Ru(2)/Co—Fe(2.34)/Ru(0.7)/Co—Fe(2.08)/Cu(2.4)/Ta(3) and Ta(3)/Ru(2)/Ir—Mn—Cr(6)/Co—Fe(2.44)/Ru(0.7)/Co—Fe(2.08)/Cu(2.4)/Ta(3) films.

FIG. 12 illustrates easy-axis and hard-axis magnetic responses of Ta(3)/Ru(2)/Co—Fe(2.34)/Ru(0.7)/Co—Fe(2.08)/Cu(2.4)/Ta(3) and Ta(3)/Ru(2)/Ir—Mn—Cr(6)/Co—Fe(2.44)/Ru(0.7)/Co—Fe(2.08)/Cu(2.4)/Ta(3) films. The first multilayer structure includes the longitudinal flux-closure structure 950 with the Ru spacer layer 915 as thin as 0.7 nm but without the Ir—Mn—Cr pinning layer 913. As a field increases in a backward longitudinal direction to an $H_2$ of as small as 103 Oe, magnetizations of the Co—Fe bias layer 914 and the Co—Fe sense layer 916 without the Ir—Mn—Cr pinning layer 913 immediately flip by 90° into downward and upward transverse directions, respectively. As the field further increases to $H_{50}$ and $H_{98}$ of 1,826 and 3,895 Oe, both the magnetizations gradually rotate toward the backward longitudinal direction until magnetization saturation indicating that the bidirectional anisotropy is very strong. As the field increases in a forward longitudinal direction, both magnetizations also flip and rotate identically indicating that the bidirectional anisotropy is symmetrical. In addition, easy-axis and hard-axis magnetic responses are indistinguishable from each other indicating that the bidirectional anisotropy is isotropic.

On the other hand, the second multilayer structure includes the longitudinal flux-closure structure 950 of FIG. 9 with the Ru spacer layer 915 as thin as 0.7 nm and the Ir—Mn—Cr pinning layer 913. As the field increases in the backward longitudinal direction to an $H_2$ of 757 Oe, magnetizations of the Co—Fe bias layer 914 and the Co—Fe sense layer 916 immediately flip by 90° into downward and upward transverse directions, respectively. As the field further increases in the backward longitudinal direction to an $H_{50}$ of 1,507 Oe, both the magnetizations gradually rotate towards the backward longitudinal direction to attain 50% of their saturation moment. On the other hand, as the field increases in the forward longitudinal direction to an $H'_2$ of −918 Oe, magnetizations of the Co—Fe bias layer 914 and the Co—Fe sense layer 916 immediately flip by 90° into upward and downward transverse directions, respectively. As the field further increases in the forward longitudinal direction to an $H'_{50}$ of 2,363 Oe, both the magnetizations gradually rotate toward the forward longitudinal direction to attain 50% of their saturation moment. In addition, the hysteresis loops are open, revealing a hysteretic magnetization switching behavior. Such asymmetrical flip, rotation, and switching behaviors indicate the incorporation of the unidirectional anisotropy into the bidirectional anisotropy in the longitudinal flux-closure structure 950 with the Ir—Mn—Cr pinning layer 913. When using the Ir—Mn—Cr pinning layer 913, it requires a field exceeding $H_{50}$, which is equivalent to $H_{BA}-H_F$ (where $H_F$ is a ferromagnetic coupling field across the Ru spacer layer 915 produced by the indirect unidirectional anisotropy), in order to rotate the magnetization of the Co—Fe sense layer 916. On the other hand, it requires a field exceeding $H'_{50}$, which is equivalent to $H_{BA}+H_{UA}$, in order to rotate the magnetization of the Co—Fe bias layer 914. These results indicate that when the unidirectional anisotropy is weaker than the bidirectional anisotropy, both the magnetizations of the Co—Fe bias layer 914 and the Co—Fe sense layer 916 are rigidly pinned leading to the non-viability of the read sensor.

Figure 13:
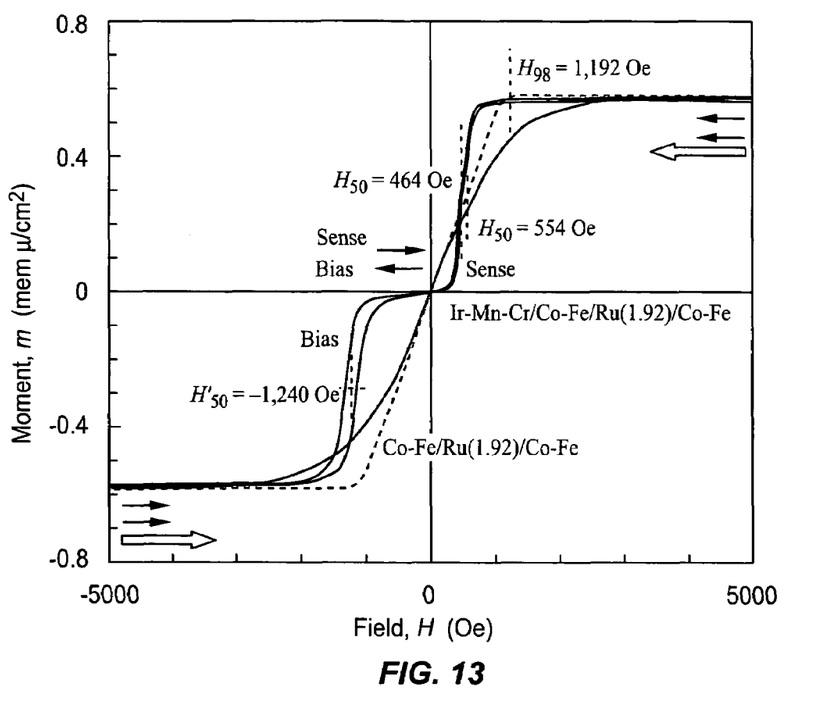
FIG. 13 is a graph illustrating easy-axis and hard-axis magnetic responses of Ta(3)/Ru(2)/Co—Fe(2.34)/Ru(1.92)/Co—Fe(2.08)/Cu(2.4)/Ta(3) and Ta(3)/Ru(2)/Ir—Mn—Cr(6)/Co—Fe(2.44)/Ru(1.92)/Co—Fe(2.08)/Cu(2.4)/Ta(3) films.

FIG. 13 illustrates easy-axis and hard-axis magnetic responses of Ta(3)/Ru(2)/Co—Fe(2.34)/Ru(1.92)/Co—Fe(2.08)/Cu(2.4)/Ta(3) and Ta(3)/Ru(2)/Ir—Mn—Cr(6)/Co—Fe(2.44)/Ru(1.92)/Co—Fe(2.08)/Cu(2.4)/Ta(3) films. In the first multilayer structure including the longitudinal flux-closure structure 950 with the Ru spacer layer 915 as thick as 1.92 nm but without the Ir—Mn—Cr pinning layer 913, the Co—Fe bias layer 914, and the Co—Fe sense layer 916 exhibit $H_{50}$ and $H_{98}$ of as low as 554 and 1,192 Oe, respectively, indicating a weak bidirectional anisotropy. In the second multilayer structure including the longitudinal flux-closure structure 950 with the Ru spacer layer 915 as thick as 1.92 nm and including the Ir—Mn—Cr pinning layer 913, the Co—Fe bias layer 914 and the Co—Fe sense layer 916 behave as if two independent units, significantly different from those previously described. As the field increases to as high as −1,000 Oe in the forward longitudinal direction, the magnetization of the Co—Fe bias layer 914 still remains rigidly pinned in the backward longitudinal direction. This indicates that even when the field overcomes the weak bidirectional anisotropy, the strong direct unidirectional anisotropy still prevents the magnetization of the Co—Fe bias layer 914 from flip and rotation. As the field approaches an $H'_{50}$ of −1,240 Oe to overcome the bidirectional and unidirectional anisotropies, the magnetization of the Co—Fe bias layer 914 finally switches by 180° into the forward longitudinal direction. On the other hand, as the field approaches an $H_{50}$ of as low as 464 Oe in the backward longitudinal direction, the magnetization of the Co—Fe sense layer 916 starts to switch. The magnetization of the Co—Fe sense layer 916 does not flip at all because the magnetization flip requires two mutually interactive magnetizations but the magnetization of the Co—Fe bias layer 914 is rigidly pinned. These results predict that, in a magnetic disk drive, while the strong unidirectional anisotropy provided by the Ir—Mn—Cr pinning layer 913 rigidly pins the magnetization of the Co—Fe bias layer 914, the weak bidirectional anisotropy provided by the thick Ru spacer layer 915 biases or stabilizes the magnetization the Co—Fe sense layer 916, still allowing the magnetization of the Co—Fe sense layer 916 to freely rotate in response to external fields stemming from the magnetic disk.

Figure 14:
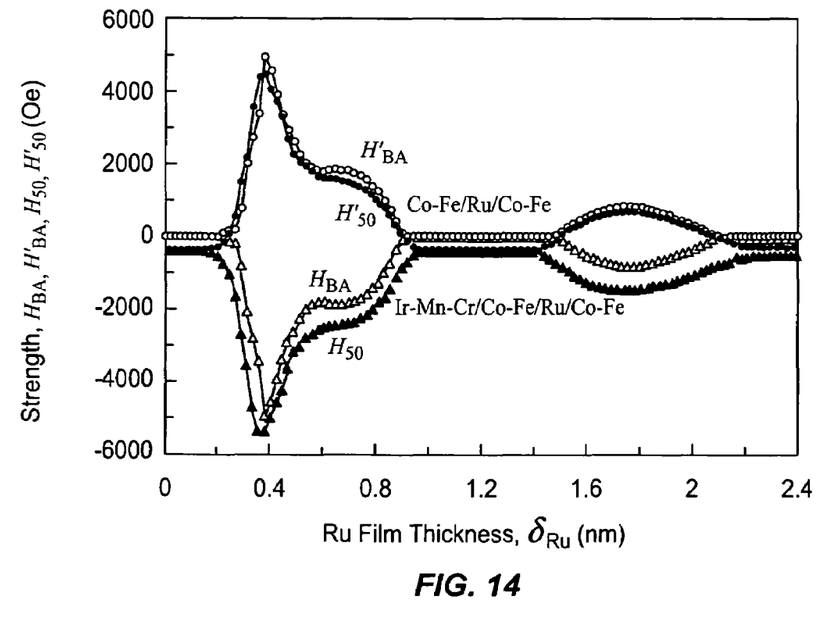
FIG. 14 is a graph illustrating critical fields ($H_{50}$ and $H'_{50}$) versus the Ru film thickness ($\delta_{Ru}$) for Ta(3)/Ru(2)/Co—Fe (2.34)/Ru/Co—Fe(2.08)/Cu(2.4)/Ta(3) and Ta(3)/Ru(2)/Ir—Mn—Cr(6)/Co—Fe(2.44)/Ru/Co—Fe(2.08)/Cu(2.4)/Ta(3) films.

FIG. 14 illustrates critical fields ($H_{50}$ and $H'_{50}$) versus the Ru film thickness ($\delta_{Ru}$) for Ta(3)/Ru(2)/Co—Fe(2.34)/Ru/Co—Fe(2.08)/Cu(2.4)/Ta(3) and Ta(3)/Ru(2)/Ir—Mn—Cr(6)/Co—Fe(2.44)/Ru/Co—Fe(2.08)/Cu(2.4)/Ta(3) films. In the first multilayer structure including the longitudinal flux-closure structure 950 without the Ir—Mn—Cr pinning layer 913, antiparallel coupling across the Ru spacer layer 915 causes the magnetizations of the Co—Fe bias layer 914 and the Co—Fe sense layer 916 to symmetrically flip and rotate as the field increases in three $\delta_{Ru}$ ranges of from 0.23 to 0.56 nm, from 0.56 to 0.92 nm, and from 1.49 to 2.09 nm. Both $H_{50}$ and $H'_{50}$ oscillate with $\delta_{Ru}$ in the three $\delta_{Ru}$ ranges, reaching identical absolute peak values of 4,952, 1,820, and 824 Oe at $\delta_{Ru}$=0.38, 0.7, and 1.78 nm, respectively. In the second multilayer structure including the longitudinal flux-closure structure 950 with the Ir—Mn—Cr pinning layer 913, the magnetizations of the Co—Fe bias layer 914 and the Co—Fe sense layer 916 asymmetrically flip, rotate, or switch as the field increases. $H'_{50}$ oscillates with $\delta_{Ru}$, reaching peak values of −5,358, −2,340, and −1,473 Oe at $\delta_{Ru}$=0.38, 0.7, and 1.78 nm, respectively. $H_{50}$ also oscillates with $\delta_{Ru}$, reaching peak values of 4,483, 1,522, and 678 Oe at $\delta_{Ru}$=0.38, 0.7 and 1.78 nm, respectively. In addition to the oscillatory antiferromagnetic coupling in the three $\delta_{Ru}$ ranges, the use of the Ir—Mn—Cr pinning layer 913 also reveals parallel coupling occurring in two $\delta_{Ru}$ ranges from 0 to 0.23 nm and from 0.92 to 1.49 nm.

Figure 15:
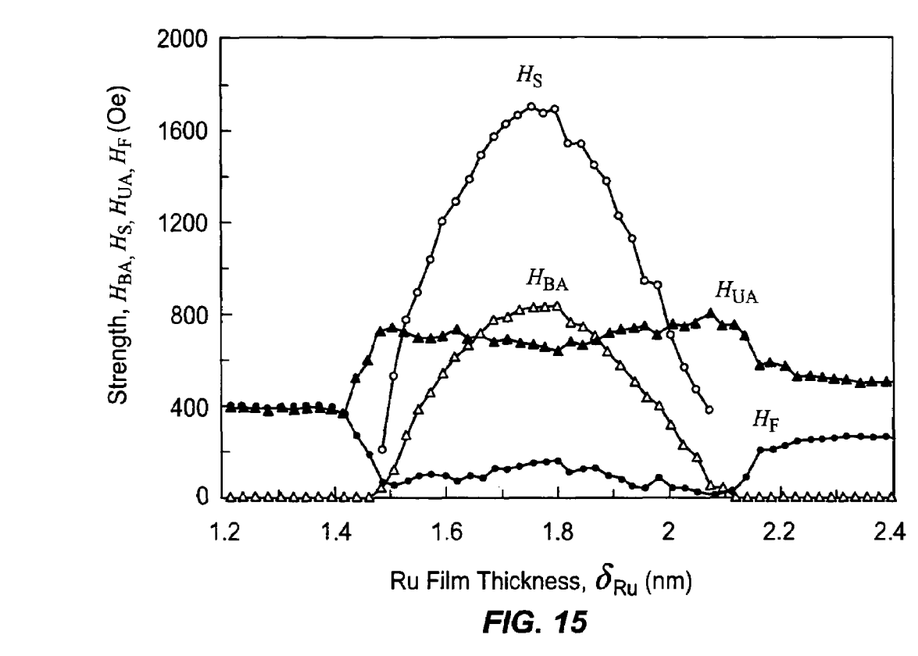
FIG. 15 is a graph illustrating strengths ($H_{B4}$, $H_S$, $H_{UA}$ and $H_F$) versus the Ru film thickness ($\delta_{Ru}$) for the multilayer structures described in FIG. 14.

FIG. 15 illustrates strengths ($H_{BA}$, $H_S$, $H_{UA}$ and $H_F$) versus the Ru film thickness ($\delta_{Ru}$) for the multilayer structures described in FIG. 14. $H_{UA}$ is insensitive to $\delta_{Ru}$, remaining as high as around 700 Oe over the third oscillation region. The field must exceed such a high $H_{UA}$ to switch the magnetization of the Co—Fe bias layer 914, the sum of $H_{UA}$ and $H_{BA}$ to rotate the magnetization by 90°, and the sum of $H_{UA}$ and $H_S$ to rotate the magnetization by 180°. When $H_{UA}$ is higher than $H_S$, the magnetization of the Co—Fe bias layer 914 will not flip at all. On the other hand, $H_F$ is as low as around 100 Oe over the third oscillation region. Because $H_F$ counteracts $H_{BA}$, the field only needs to exceed the difference of $H_{BA}$ and $H_F$ to switch the magnetization of the Co—Fe sense layer 916. This difference of $H_{BA}$ and $H_F$ can be tuned by varying $\delta_{Ru}$ in the third oscillation region to stabilize the Co—Fe sense layer 916 while maintaining high read sensitivity.

It should be noted that the multiple layers described in FIG. 9 are deposited with an ion-beam sputtering mode. If the multiple layers are deposited with a magnetron sputtering mode, less mixing at Co—Fe/Ru/Co—Fe interfaces will cause substantial improvements in the bidirectional anisotropy. For example, a change in the deposition mode from ion-beam to magnetron sputtering for the Ta(3)/Ru(2)/Co—Fe(8)/Ru(0.7)/Co—Fe(8)/Cu(2.4)/Ta(3) films causes an increase in the $H_S$ (normalized for a total moment of 2.24 memu/cm$^2$) from 1,130 to 2,731 Oe, corresponding with an increase in an antiparallel-coupling energy from 0.63 to 1.53 erg/cm$^2$ However, such an extremely strong bidirectional anisotropy is not suitable for the longitudinal flux-closure structure 950 due to concerns on read sensitivity.

Figure 16:
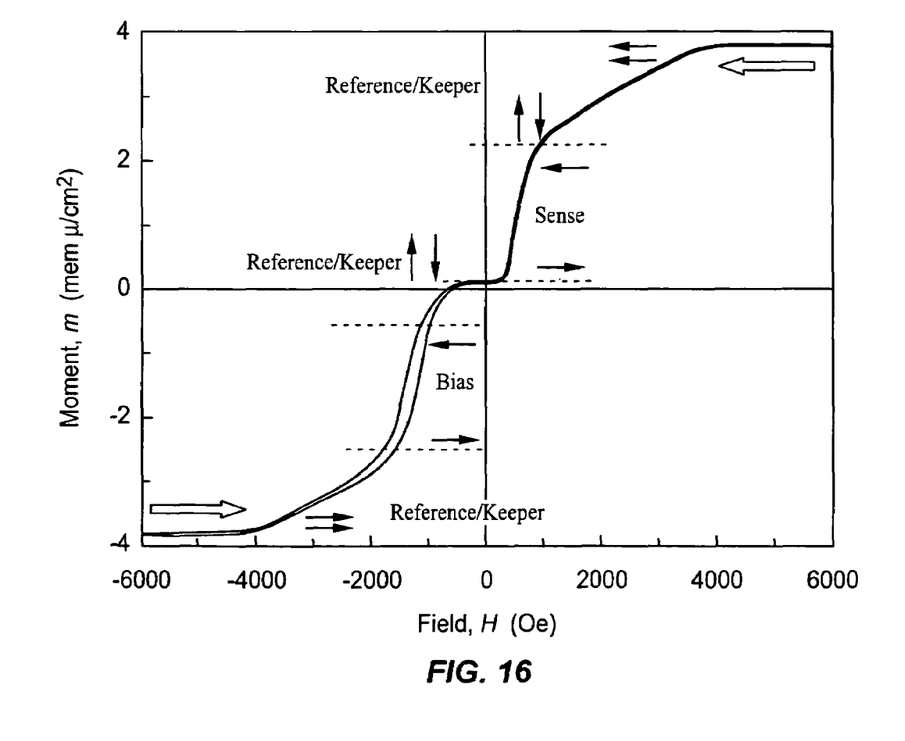
FIG. 16 is a graph illustrating easy-axis magnetic responses of the read sensor of FIG. 9 comprising Ta(3)/Ru(2)/Ir—Mn—Cr(6)/Co—Fe(2.44)/Ru(1.92)/Co—Fe(2.08)/Cu(1.2)/Cu—O(0.6)/Cu(1.2)/Co—Fe(2.08)/Ru(0.7)/Co—Fe(2.44)/Ir—Mn—Cr(6)/Ta(3) films.

FIG. 16 illustrates easy-axis magnetic responses of the read sensor 910 comprising Ta(3)/Ru(2)/Ir—Mn—Cr(6)/Co—Fe(2.44)/Ru(1.92)/Co—Fe(2.08)/Cu(1.2)/Cu—O(0.6)/Cu(1.2)/Co—Fe(2.08)/Ru(0.7)/Co—Fe(2.44)/Ir—Mn—Cr(6)/Ta(3) films. In the longitudinal flux-closure 950 comprising the Ir—Mn—Cr pinning layer 913, the Co—Fe bias layer 914, the Ru spacer layer 915, and the Co—Fe sense layer 916, the net moment of the Co—Fe bias layer 914 and the Co—Fe sense layer 916 is nearly zero for the cancellation of demagnetizing fields, and the Ru spacer layer 915 is thick for inducing an $H_{UA}$ that is larger than $H_{BA}$. The thickness of the Ru spacer layer 915 is selected from the third oscillation of the antiferromagnetic coupling as shown in FIGS. 14 and 15. On the other hand, in the transverse flux-closure structure 150 comprising the Co—Fe reference layer 118, the Ru spacer layer 119, the Co—Fe keeper layer 120, and the Ir—Mn—Cr pinning layer 121, the net moment of the Co—Fe keeper layer 120 and the Co—Fe reference layer 118 is also nearly zero for the cancellation of demagnetizing fields, and the Ru spacer layer 119 is thin for inducing an $H_{BA}$ much larger than $H_{UA}$. The thickness of the Ru spacer layer 119 is selected from the first or second oscillation of the antiferromagnetic coupling as shown in FIGS. 14 and 15.

Although the main difference between the longitudinal flux-closure structure 950 and transverse flux-closure structure 150 is the use of the thick and thin Ru spacer layers, substantial different magnetic responses are observed. The thicker (greater than about 1.5 nm) Ru spacer layer 915 causes the magnetizations of the Co—Fe bias layer 914 and the Co—Fe sense layer 916 in the longitudinal flux-closure structure 950 to exhibit independent magnetic responses. One is rigidly pinned in low fields but switched in high fields, and the other switched in low fields. The easy-axis-type magnetization switching behaviors indicates that $H_{UA}$ is higher than $H_{BA}$.

On the other hand, the thin Ru spacer layer 919 causes the magnetizations of the Co—Fe keeper layer 120 and the Co—Fe reference layer 118 in the transverse flux-closure structure 150 to exhibit mutually interactive magnetic responses as if a single unit, both rigidly pinned in low fields and both flipped and rotated in high fields. The hard-axis-type magnetization flip and rotation behaviors indicate that $H_{BA}$ is higher than $H_{UA}$.

To further distinguish the longitudinal flux-closure structure 950 from the transverse flux-closure structure 150, the Ta/Ru/Ir—Mn—Cr/Co—Fe/Ru/Co—Fe films may be deposited in the ion-beam sputtering system, while the Cu/oxide/Cu/Co—Fe/Ru/Co—Fe/Ir—Mn—Cr/Ta may be deposited in a magnetron sputtering system. The magnetron sputtering mode provides the transverse flux-closure structure 150 with a unidirectional anisotropy 2 times stronger and a bidirectional anisotropy 2.4 times stronger than the ion-beam sputtering mode. The stronger bidirectional anisotropy should not be used in the longitudinal flux-closure structure 950 to prevent the magnetization of the Co—Fe sense layer 915 from stiffness, but can be used in the transverse flux-closure structure 150 for much stronger pinning.

Although specific embodiments were described herein, the scope of the invention is not limited to those specific embodiments. The scope of the invention is defined by the following claims and any equivalents thereof.

I claim:

1. A read sensor with a longitudinal flux-closure structure, the read sensor comprising:
   an antiferromagnetic pinning layer;
   a ferromagnetic bias layer adjacent to the antiferromagnetic pinning layer;
   a nonmagnetic spacer layer adjacent to the ferromagnetic bias layer; and
   a ferromagnetic sense layer adjacent to the nonmagnetic spacer layer forming the longitudinal flux-closure structure;
   wherein a magnetization of the ferromagnetic bias layer is pinned in a longitudinal direction by the antiferromagnetic pinning layer, and the longitudinal magnetization of the ferromagnetic bias layer biases the ferromagnetic sense layer across the nonmagnetic spacer layer in the longitudinal direction;
   wherein exchange coupling between the antiferromagnetic pinning layer and the ferromagnetic bias layer is stronger than antiparallel coupling across the nonmagnetic spacer layer between the ferromagnetic bias layer and the ferromagnetic sense layer.

2. The read sensor of claim 1 wherein:
   the antiferromagnetic pinning layer is made of an Ir—Mn—Cr film having a Mn content ranging from 50 to 90%, a Cr content ranging from 0 to 10%, and a thickness ranging from 4 to 10 nm;
   the ferromagnetic bias layer is made of a Co—Fe—B film having an Fe content ranging from 0 to 60%, a B content ranging from 0 to 40%, and a thickness ranging from 4 to 10 nm;
   the nonmagnetic spacer layer is made of a Ru film having a thickness ranging from 1.5 to 2.1 nm, a Cr film having a thickness ranging from 1 to 2 nm, or an Ir film having a thickness ranging from 1 to 2 nm; and
   the ferromagnetic sense layer is made of a Co—Fe—Ni—B film having a Fe content ranging from 0 to 60%, a Ni content ranging from 0 to 40%, a B content ranging from 0 to 40%, and a thickness ranging from 4 to 10 nm.

3. The read sensor of claim 1 wherein the magnitude of the antiparallel coupling depends on the thickness of the nonmagnetic spacer layer.

4. The read sensor of claim 3 wherein the thickness of the nonmagnetic spacer layer is selected based on a thickness corresponding with the third oscillation of the antiparallel coupling between the ferromagnetic bias layer and the ferromagnetic sense layer.

5. The read sensor of claim 3 wherein the nonmagnetic spacer layer composes:
   an Ru film at least 1.5 nm thick.

6. The read sensor of claim 1 further comprising:
   at least one nonmagnetic seed layer adjacent to the antiferromagnetic pinning layer, wherein the magnitude of the exchange coupling depends on the at least one nonmagnetic seed layer.

7. The read sensor of claim 6 wherein the at least one nonmagnetic seed layer comprises:
   a first nonmagnetic seed layer made of a Ta film having a thickness ranging from 2 to 20 nm; and
   a second nonmagnetic seed layer made of a Ru, Pt, Cr, or Cu film having a thickness ranging from 2 to 10 nm.

8. A method of forming a longitudinal flux-closure structure for a read sensor, the method comprising:
   depositing an antiferromagnetic pinning layer;
   depositing a ferromagnetic bias layer on top of the antiferromagnetic pinning layer;
   depositing a nonmagnetic spacer layer on top of the ferromagnetic bias layer; and
   depositing a ferromagnetic sense layer on top of the nonmagnetic spacer layer;
   wherein a magnetization of the ferromagnetic bias layer is pinned in a longitudinal direction by the antiferromagnetic pinning layer, and the longitudinal magnetization of the ferromagnetic bias layer biases the ferromagnetic sense layer across the nonmagnetic spacer layer in the longitudinal direction;
   wherein exchange coupling between the antiferromagnetic pinning layer and the ferromagnetic bias layer is stronger than antiparallel coupling across the nonmagnetic spacer layer between the ferromagnetic bias layer and the ferromagnetic sense layer.

9. The method of claim 8 wherein:
   the antiferromagnetic pinning layer is made of an Ir—Mn—Cr film having a Mn content ranging from 50 to 90, a Cr content ranging from 0 to 10%, and a thickness ranging from 4 to 10 nm;
   the ferromagnetic bias layer is made of a Co—Fe—B film having a Fe content ranging from 0 to 60%, a B content ranging from 0 to 40%, and a thickness ranging from 4 to 10 nm;
   the nonmagnetic spacer layer is made of a Ru film having a thickness ranging from 1.5 to 2.1 nm, a Cr film having a thickness ranging from 1 to 2 nm, or an Ir film having a thickness ranging from 1 to 2 nm; and
   the ferromagnetic sense layer is made of a Co—Fe—Ni—B film having a Fe content ranging from 0 to 60%, a Ni content ranging from 0 to 40%, a B content ranging from 0 to 40%, and a thickness ranging from 4 to 10 nm.

10. The method of claim 8 wherein the magnitude of the antiparallel coupling depends on the thickness of the nonmagnetic spacer layer.

11. The method of claim 10 wherein the thickness of the nonmagnetic spacer layer is selected based on a thickness corresponding with the third oscillation of the antiparallel coupling between the ferromagnetic bias layer and the ferromagnetic sense layer.

12. The method of claim 10 wherein depositing the nonmagnetic spacer layer comprises:
    depositing an Ru film at least 1.5 nm thick.

13. The method of claim 8 further comprising:
    depositing at least one nonmagnetic seed layer before depositing the antiferromagnetic pinning layer, wherein the magnitude of the exchange coupling depends on the at least one nonmagnetic seed layer.

14. The method of claim 13 wherein depositing the at least one nonmagnetic seed layer comprises:
    depositing a first nonmagnetic seed layer made of a Ta film having a thickness ranging from 2 to 20 nm; and
    depositing a second nonmagnetic seed layer made of a Ru, Pt, Cr, or Cu film having a thickness ranging from 2 to 10 nm.

15. A read sensor, comprising:
    at least one nonmagnetic seed layer;
    a first antiferromagnetic pinning layer adjacent to the at least one nonmagnetic seed layer;
    a ferromagnetic bias layer adjacent to the first antiferromagnetic pinning layer;
    a first nonmagnetic spacer layer adjacent to the ferromagnetic bias layer;
    a ferromagnetic sense layer adjacent to the first nonmagnetic spacer layer;
    wherein a magnetization of the ferromagnetic bias layer is pinned in a backward longitudinal direction by the first antiferromagnetic pinning layer, and the longitudinal magnetization of the ferromagnetic bias layer biases the ferromagnetic sense layer across the first nonmagnetic spacer layer in a forward longitudinal direction;

wherein antiferromagnetic/ferromagnetic exchange coupling between the first antiferromagnetic pinning layer and the ferromagnetic bias layer induces a unidirectional anisotropy and ferromagnetic/ferromagnetic antiparallel coupling across the first nonmagnetic spacer layer induces a bidirectional anisotropy, wherein the unidirectional anisotropy is larger than the bidirectional anisotropy;

a GMR spacer or TMR barrier layer adjacent to the ferromagnetic sense layer;

a ferromagnetic reference layer adjacent to the GMR spacer or TMR barrier layer;

a second nonmagnetic spacer layer adjacent to the ferromagnetic reference layer;

a ferromagnetic keeper layer adjacent to the second nonmagnetic spacer layer;

a second antiferromagnetic pinning layer adjacent to the ferromagnetic keeper layer; and a nonmagnetic cap layer adjacent to the second antiferromagnetic pinning layer.

16. The read sensor of claim 15 wherein the magnitude of the bidirectional anisotropy depends on the thickness of the first nonmagnetic spacer layer.

17. The read sensor of claim 16 wherein the first nonmagnetic spacer layer comprises:
a Ru film at least 1.5 nm thick.

18. The read sensor of claim 15 wherein the magnitude of the unidirectional anisotropy depends on the at least one nonmagnetic seed layer.

19. The read sensor of claim 18 wherein the at least one nonmagnetic seed layer comprises:
a first nonmagnetic seed layer made of a Ta film having a thickness ranging from 2 to 20 nm; and
a second nonmagnetic seed layer made of a Ru, Pt, Cr or Cu film having a thickness ranging from 2 to 10 nm.

20. The read sensor of claim 15 wherein:
the first antiferromagnetic pinning layer is made of an Ir—Mn—Cr film having a Mn content ranging from 50 to 90%, a Cr content ranging from 0 to 10%, and a thickness ranging from 4 to 10 nm;
the ferromagnetic bias layer is made of a Co—Fe—B film having a Fe content ranging from 0 to 60%, a B content ranging from 0 to 40%, and a thickness ranging from 4 to 10 nm;
the first nonmagnetic spacer layer is made of a Ru film having a thickness ranging from 1.5 to 2.1 nm, a Cr film having a thickness ranging from 1 to 2 nm, or an Ir film having a thickness ranging from 1 to 2 nm; and
the ferromagnetic sense layer is made of a Co—Fe—Ni—B film having a Fe content ranging from 0 to 60%, a Ni content ranging from 0 to 40%, a B content ranging from 0 to 40%, and a thickness ranging from 4 to 10 nm.

21. The read sensor of claim 15 wherein the magnetization of the ferromagnetic bias layer is rigidly pinned due to the additive effects of the unidirectional anisotropy and the bidirectional anisotropy.

22. The read sensor of claim 21 wherein the magnetization of the ferromagnetic sense layer is biased due to the subtractive effects of the unidirectional anisotropy and the bidirectional anisotropy.

23. A method of fabricating a read sensor, the method comprising:
depositing at least one nonmagnetic seed layer;
depositing a first antiferromagnetic pinning layer on top of the at least one nonmagnetic seed layer;
depositing a ferromagnetic bias layer on top of the first antiferromagnetic pinning layer;
depositing a first nonmagnetic spacer layer on top of the ferromagnetic bias layer;
depositing a ferromagnetic sense layer on top of the nonmagnetic spacer layer;
wherein a magnetization of the ferromagnetic bias layer is pinned in a backward longitudinal direction by the first antiferromagnetic pinning layer, and the longitudinal magnetization of the ferromagnetic bias layer biases the ferromagnetic sense layer across the first nonmagnetic spacer layer in a forward longitudinal direction;

wherein antiferromagnetic/ferromagnetic exchange coupling between the first antiferromagnetic pinning layer and the ferromagnetic bias layer induces a unidirectional anisotropy and ferromagnetic/ferromagnetic antiparallel coupling across the first nonmagnetic spacer layer induces a bidirectional anisotropy, wherein the unidirectional anisotropy is larger than the bidirectional anisotropy;

depositing a GMR spacer or TMR barrier layer on top of the ferromagnetic sense layer;

depositing a ferromagnetic reference layer on top of the GMR spacer or TMR barrier layer;

depositing a second nonmagnetic spacer layer on top of the ferromagnetic reference layer;

depositing a ferromagnetic keeper layer on top of the second nonmagnetic spacer layer;

depositing a second antiferromagnetic pinning layer on top of the ferromagnetic keeper layer; and depositing a nonmagnetic cap layer on top of the second antiferromagnetic pinning layer.

24. The method of claim 23 further comprising:
annealing the read sensor in a transverse direction; and
annealing the read sensor in the backward longitudinal direction.

25. The method of claim 24 wherein:
annealing the read sensor in a transverse direction comprises annealing the read sensor in a field ranging from 10,000 to 50,000 Oe in an upward transverse direction for a time ranging from 1 to 10 hours at temperatures ranging from 240 to 280° C.; and
annealing the read sensor in the backward longitudinal direction comprises annealing the read sensor in a field ranging from 200 to 1,000 Oe in the backward longitudinal direction for a time ranging from 1 to 10 hours at temperatures ranging from 200 to 240° C.

26. The method of claim 23 wherein the magnitude of the bidirectional anisotropy depends on the thickness of the first nonmagnetic spacer layer.

27. The method of claim 26 wherein depositing the first nonmagnetic spacer layer comprises:
depositing an Ru film at least 1.5 nm thick.

28. The method of claim 23 wherein the magnitude of the unidirectional anisotropy depends on the at least one nonmagnetic seed layer.

29. The method of claim 28 wherein the at least one nonmagnetic seed layer comprises:
depositing a first nonmagnetic seed layer made of a Ta film having a thickness ranging from 2 to 20 nm; and
depositing a second nonmagnetic seed layer made of a Ru, Pt, Cr, or Cu film having a thickness ranging from 2 to 10 nm.

30. The method of claim 23 wherein:
the first antiferromagnetic pinning layer is made of an Ir—Mn—Cr film having a Mn content ranging from 50 to 90%, a Cr content ranging from 0 to 10%, and a thickness ranging from 4 to 10 nm;

the ferromagnetic bias layer is made of a Co—Fe—B film having a Fe content ranging from 0 to 60%, a B content ranging from 0 to 40%, and a thickness ranging from 4 to 10 nm;

the first nonmagnetic spacer layer is made of a Ru film having a thickness ranging from 1.5 to 2.1 nm, a Cr film having a thickness ranging from 1 to 2 nm, or an Ir film having a thickness ranging from 1 to 2 nm;

the ferromagnetic sense layer is made of a Co—Fe—Ni—B film having a Fe content ranging from 0 to 60%, a Ni content ranging from 0 to 40%, a B content ranging from 0 to 40%, and a thickness ranging from 4 to 10 nm.

31. The method of claim 23 wherein the magnetization of the ferromagnetic bias layer is rigidly pinned due to the additive effects of the unidirectional anisotropy and the bidirectional anisotropy.

32. The method of claim 31 wherein the magnetization of the ferromagnetic sense layer is biased due to the subtractive effects of the unidirectional anisotropy and the bidirectional anisotropy.

* * * * *